UNITED STATES PATENT OFFICE 1,993,907

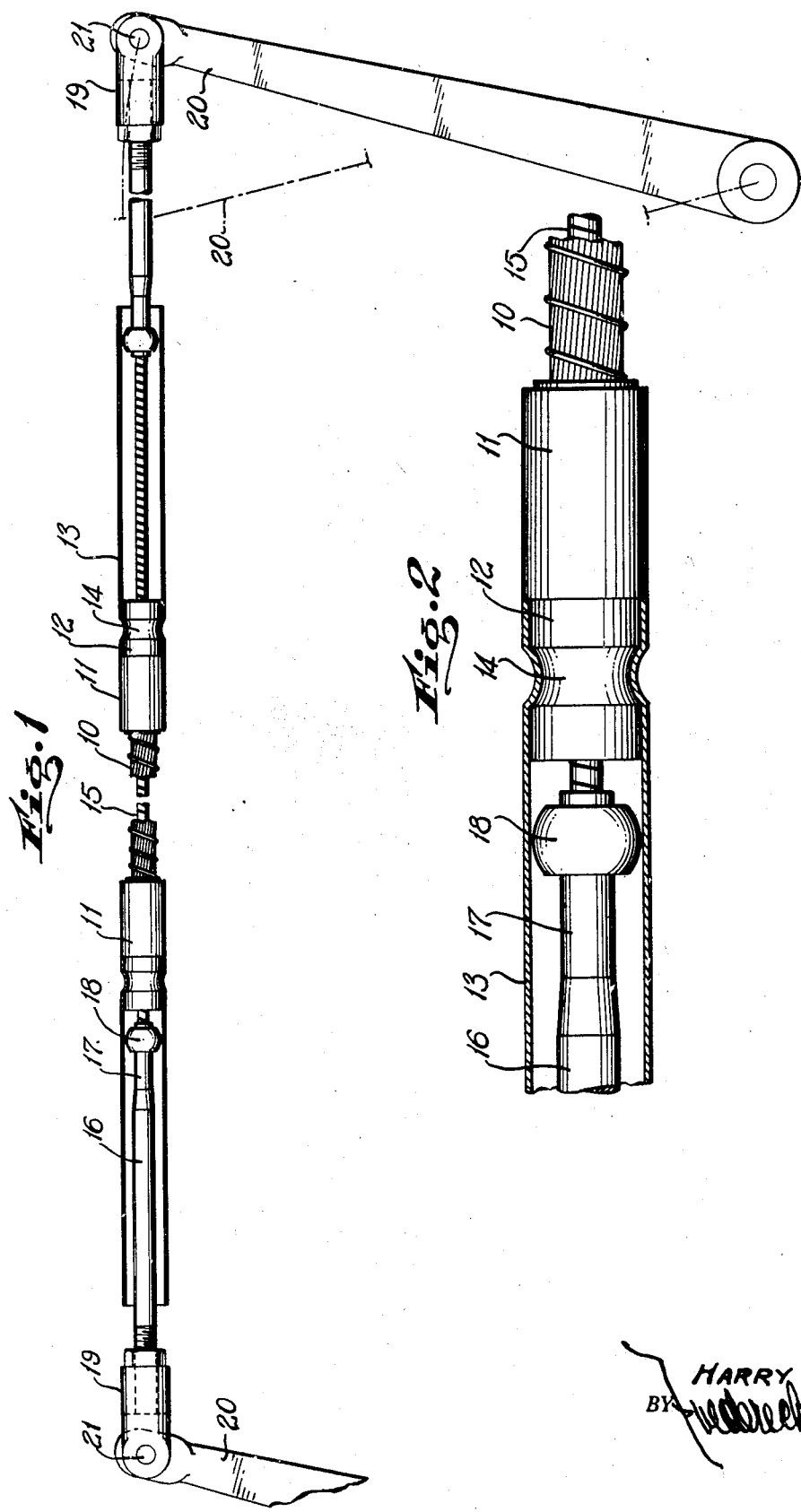

POWER TRANSMITTING DEVICE

Harry Williams, Birmingham, Mich., assignor to American Cable Company, Inc., New York, N. Y., a corporation of Delaware Application August 19, 1933, Serial No. 685,914

7 Claims. (Cl. 74—39)

My invention relates to power transmitting devices of the reciprocating type comprising a tubular casing or guide member through which passes an elongated flexible tension and/or compression member, power being transmitted by effecting longitudinal movement of one member with respect to the other.

An object of the present invention is to provide a structure of the character described above which is particularly adapted to impart motion to an oscillatable member, as, for instance, a lever arm.

If the power transmitting member is directly attached to the lever it must not only move lengthwise but must also be capable of angular movement in the plane of oscillation of the lever in order to accommodate itself to the arc of travel of its point of attachment to the lever.

It is a specific object of my invention to provide a power transmitting device permitting relative oscillatory movement of terminal portions of the inner and outer members.

A more specific object of the invention is to provide the casing member with a rigid sleeve extension, and the inner member with a rigid rod-like extension, the latter being formed at or adjacent its inner end with a spherical enlargement slidable in the sleeve and adapted to provide a fulcrum for relative oscillation of the rod and sleeve.

Another object of the invention is to provide means for preventing the rod portion from being moved with respect to the sleeve far enough to draw said enlargement out of the sleeve, thereby, precluding the possibility that said enlargement might catch on the end of the sleeve when movement of the rod is reversed.

With these and other objects in view I shall now describe a preferred embodiment of my invention and thereafter shall point out the novelty and scope of the invention in the claims.

In the accompanying drawing;

Figure 1 is a fragmental side view partly in section showing a structure embodying my invention and applied in the transmission of power from one lever arm to another; and Fig. 2 is a detail view on a larger scale of a portion of Fig. 1.

The power transmitting device shown in the drawing comprises a flexible tubular casing 10 of well-known structure comprising a set of wires securely bound at each end by ferrules 11. Each ferrule is formed at its outer end with a portion 12 of reduced diameter on which a sleeve 13 is fitted. Each portion 12 of the ferrule is formed with an annular groove or recess 14 into which the sleeve is swaged, thereby securely fastening the sleeve to the ferrule. Each sleeve extends to a considerable distance beyond the ferrule and virtually forms a rigid extension of the tubular casing 10.

Fitted to slide within the tubular casing 10 is an extended flexible member 15. This may consist of a wire, a flexible rod, a cable strand or any other body which may serve either as a tension member or a compression member or both. Hereafter the member 15 will be termed the "strand", although it will be understood that this term is intended to include any suitable structure of the character just described. The strand 15 is of greater length than the casing 10 with its ferrules 11. Secured to each end of the strand is a rod 16 which is relatively rigid. The rod may be secured to the strand in any well known manner. For instance, it may be provided with a tubular portion 17 which is fitted over the end of the strand and is then swaged thereon.

On the portion 17 of each rod, preferably at the inner extremity thereof, there is a collar 18 which may be driven tightly upon the rod after it has been secured to the strand 15 or may be welded thereon or formed thereon by upsetting. This collar or boss 18 is provided with a spherical outer surface and is of a size to slide freely but preferably snugly in the tube 13. The outer end of each rod may be threaded, as shown, for attachment to a forked fitting 19 adapted to embrace the end of a lever arm 20 to which it may be pivotally secured by a pin 21.

In practice either the casing or the strand may serve as a power transmitting element, the other element being terminally fixed. In Fig. 1 the strand is used as the power element for transmitting power from one arm 20 to the other. It will be understood that the ferrules 11 are secured to fixed supports not shown. The rods 16 not only slide in the guide sleeves 13 but must also rock on their collars or bosses 18 as fulcrums, because as each lever 20 oscillates on its fulcrum its pin 21 is carried through an arc, as indicated at the right hand side of Fig. 1, causing the rod 16 connected thereto to oscillate as it reciprocates in the sleeve 13.

It is essential to limit the stroke of movement of the strand 15 so that neither boss 18 will ever be carried out beyond the end of the sleeve in which it reciprocates. To this end the distance from the outer end of each ferrule to the extremity of the sleeve at the opopsite end of the tubular casing is made at least as great and preferably greater than the center to center spacing of the bosses. Thus, each boss 18 serves as a stop to limit the outward movement of the opposite boss.

In assembling the power transmitting device, I prefer to proceed as follows: The tubular casings 10 are manufactured in the usual way with ferrules 11 fixed thereon at the proper distance apart. The strand is then introduced into the casing and the rods 16 are secured thereto by swaging and the bosses or collars 18 are driven or formed on the portions 17 of the rods. Thereafter the sleeves 13 are fitted over the rods and strand upon the portions 12 of the ferrules and finally are swaged into the groves 14. This procedure is necessary because after the sleeves 13 are in place the ends of the strand 15 are not accessible for attachment of the rods 16 thereto.

While I have described a preferred embodiment of my invention this will be understood as merely illustrative and not limitative and I reserve the right to make such changes in form, construction and arrangement of parts as fall within the spirit and scope of the following claims.

I claim:

1. In combination, a tubular casing formed with a rigid terminal sleeve portion, a flexible strand slidable in the casing and formed with a rigid terminal rod portion, and means on one of said portions providing a fulcrum for relative oscillation of the sleeve and rod.

2. In combination, a tubular casing formed with a rigid terminal sleeve portion, a flexible strand slidable in the casing and formed with a rigid terminal rod portion, and a boss on the rod portion slidable in the sleeve as a guide and adapted to provide a fulcrum for relative oscillation of the sleeve and rod.

3. In combination, a tubular casing formed with a rigid terminal sleeve portion, a flexible strand slidable in the casing and formed with a rigid terminal rod portion, and a boss on the rod portion slidable in the sleeve, the outer face of the boss being curved in an axial plane of the rod portion so as to provide a fulcrum for relative oscillation of the sleeve and rod in said plane.

4. In combination, a tubular casing formed with a rigid terminal sleeve portion, a flexible strand slidable in the casing and formed with a rigid terminal rod portion, and a boss on the rod portion slidable in the sleeve and having a spherical outer face to form a fulcrum for relative oscillation of the sleeve and rod.

5. In combination, a tubular casing formed with a rigid terminal sleeve portion, a flexible strand slidable in the casing and formed with a rigid terminal rod portion, a boss on the rod portion slidable in the sleeve as a guide and adapted to serve as a fulcrum for relative oscillation of the sleeve and rod, and a stop for preventing the boss from sliding clear of the outer extremity of the tube.

6. In combination, a tubular casing formed at each end thereof with a rigid terminal sleeve portion, a flexible strand member slidable in the casing and formed at each end thereof with a terminal rod portion, and a boss on each rod near the inner end thereof, each boss being slidable in the adjacent sleeve as a guide and being adapted to serve as a fulcrum for relative oscillation of the sleeve and rod, the distance from the outer end of each ferrule to the outer extremity of the sleeve at the opposite end of the casing being at least as great as the center to center spacing of the bosses.

7. In combination, a tubular casing formed at each end with a ferrule, a sleeve adapted to fit on each ferrule and be attached thereto to form a rigid extension of the tubular casing, a strand slidable in the casing and formed at each end with a rigid terminal rod portion, and a spherical boss on each rod portion fitted to slide in the sleeve, the spacing of the bosses with respect to that of the ferrules being such that each boss serves as a stop to prevent the opposite boss from moving beyond the outer extremity of the sleeve in which it slides.

HARRY WILLIAMS.